United States Patent [19]

Schaidl et al.

[11] 4,242,968
[45] Jan. 6, 1981

[54] STEPPING ADVANCING DEVICE ADAPTED FOR USE WITH COMPONENT SUPPORT TABLES AND OTHER PURPOSES

[75] Inventors: Hubert Schaidl, Kochel am See; Josef Leingärtner Bad Heilbrunn, both of Fed. Rep. of Germany

[73] Assignee: Dorst-Keramikmaschinen-Bau Otto Dorst und Dipl.-Ing. Walter Schlegel, Kochel am See, Fed. Rep. of Germany

[21] Appl. No.: 841,370

[22] Filed: Oct. 12, 1977

[30] Foreign Application Priority Data

Oct. 14, 1976 [DE] Fed. Rep. of Germany ....... 2646465

[51] Int. Cl.³ .................. A47B 11/00; A47B 85/00; F16C 5/00
[52] U.S. Cl. .................. 108/20; 51/240 R; 108/143; 308/3 A
[58] Field of Search ............ 108/20, 21, 22, 143, 108/137; 308/3 A, 3 CH, 3.5; 269/289 R, 389 MR, 58, 59; 51/240 R

[56] References Cited

U.S. PATENT DOCUMENTS

| 3,124,018 | 3/1964 | Gough | 108/20 X |
|---|---|---|---|
| 3,124,018 | 3/1964 | Gough | 51/240 R |
| 3,204,584 | 9/1965 | Mladjan | 108/143 |
| 3,572,680 | 3/1971 | Neff | 51/240 R |
| 4,080,009 | 3/1978 | Marathe | 308/3 A |
| 4,118,101 | 10/1978 | Teramachi | 108/143 X |

FOREIGN PATENT DOCUMENTS 2229380  12/1973  Fed. Rep. of Germany ........... 108/143

*Primary Examiner*—James T. McCall
*Attorney, Agent, or Firm*—Price, Heneveld, Huizenga & Cooper

[57] ABSTRACT

The specification describes a stepping advancing device more particularly for tables for receiving components during a stage of manufacture. The device comprises a crank drive adapted to reciprocate through 180° and attached to the table. A pitman of the crank drive is pivotally connected at its free end remote from the crank shaft with an anchoring or fixing element guided for movement in the direction of movement of the table. This element is clamped to and freed from its guide at the respective end of movement of the crank drive. Furthermore there is a second fixing element, directly fixed to the table and which at the end of travel of the crank drive is detached from and clamped to a further guide, running in the direction of travel of the table, so as to perform an opposite movement to the first-mentioned fixing element.

6 Claims, 4 Drawing Figures

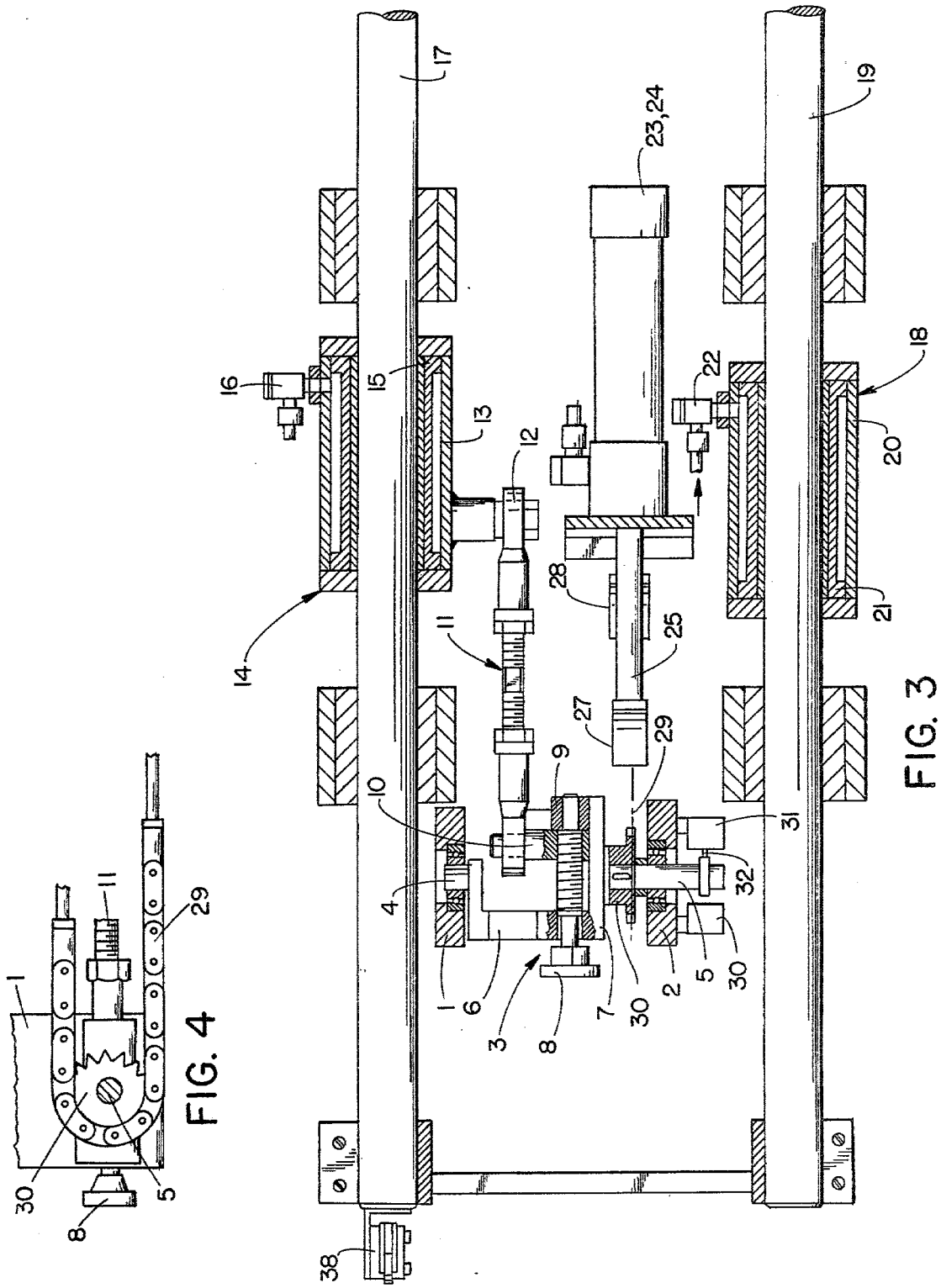

STEPPING ADVANCING DEVICE ADAPTED FOR USE WITH COMPONENT SUPPORT TABLES AND OTHER PURPOSES

BACKGROUND OF THE INVENTION (1) Field to which Invention relates

The invention relates to a stepping advancing device adapted for use with component support tables and other purposes.

(2) The Prior Art

In particular in the metallic carbide producing industry, for example in the case of the production of cutting tips for tools the task occurs of removing the pressed cutting tips from the press and depositing them on a sintering support in a precise array in such a manner that any mutual contacting of the individual cutting tips is definitely avoided.

Similar problems also occur when a number of parts are for example to be spray-painted and contact between the individual components is to be avoided at all costs, because such points of contact would lead to exposed, unpainted areas.

The problem of precise positioning of components just leaving one stage of manufacture can also occur in the packaging industry.

In particular in the case of placing articles on free receiving surfaces, for example of cutting tips on a sintering supports it is of substantial importance to see that the deposited articles are not so accelerated by the movement of the sintering support or the like that mutual displacement occurs. It is of little practical value to reduce the speed of movement of the receiving table, since such machines are designed to operate with the maximum possible speed. In the case of the depositing of cutting tips one must also consider that the presses, with which such cutting tips are produced operate with a high speed cycle and it is not possible to stack up the tips intermediately before they are arranged on the sintering supports.

SHORT SUMMERY OF THE INVENTION

One aim of the invention is therefore that of creating a stepping advancing device adapted for use with component support tables and other purposes, which not only operates with a high speed, but also makes possible a deposition of the corresponding articles with precisely defined spacing and in a regular array with there being any danger of the deposited articles, making mutual contact or being shifted by a movement of the table so that such contact occurs.

A further aim of the invention is therefore that of producing the movement of the receiving table so that it takes place without any jerks.

This aim is achieved in accordance with the invention by means of a cranked drive, which is attached to the table and is arranged to be reciprocated through 180° and it has a pitman, whose free end remote from the crank shaft is connected in a pivoting manner with an anchoring element guided for movement in the direction of movement of the table and this element is adapted to be clamped to and released from its guide at the stroke end of the crank drive and by means of a second anchoring element, directly attached to the table and which respectively at the end of the travel of the crank drive is detached from and clamped to a further guide running in the direction of movement of the table so as to perform oppositely directed strokes to the other anchoring element.

In contrast to other means such as stepping motors, which might be considered if anything and which start moving with a low acceleration, or correspondingly controlled hydraulic cylinders, the advancing device in accordance with the invention offers the advantage of particularly simple structure and of a course of movement, which can be controlled without difficulty by the use of simple limit switches. In particular with the advancing device in accordance with the invention it is possible to use pneumatic actuation of the crank drive or respectively of the anchoring means, something which substantially improves the economics of the arrangement. Normally the use of pneumatic drive means is in fact subject to reservations because the movement of a pneumatic cylinder practically always involves jerks. However the combination in accordance with the invention of a pneumatic drive cylinder with the crank drive makes it possible to solve this problem.

Furthermore in accordance with a further form of the invention the crank drive is preferably driven from a compressed air cylinder-piston arrangement.

Although the use of double acting cylinders is something which should be considered, it is particularly appropriate if, in accordance with a further development of the invention, to superpose, single acting compressed air cylinder-piston arrangements are provided, whose free piston rod ends are connected via a chain with each other, which is passed around a wheel connected with the crank shaft. In this manner it is possible to shorten the drive arrangement considerably without the arrangement being excessive in height, because owing to the height of the press sufficient vertical space is in any case available, within which superposed cylinder-piston arrangements can be accommodated without any difficulties.

The anchor devices or elements can conveniently be in the form of sleeves arranged to slide on the guides and the sleeves enclose cuffs, which can be pneumatically pressed onto the guides.

In accordance with a further form of the invention the throw or eccentricity of the crank shaft is steplessly adjustable so that as a result the spacing between articles to be deposited on the table can be adjusted without any difficulty in order to suit particular circumstances.

In order to simplify the design there is the further provision in accordance with the invention for the guides for the anchoring elements also to serve as guides for the table.

In order to be able to form an array extending into two perpendicular directions of articles on the table in accordance with a further embodiment of the invention two devices are provided for forming a cross table arrangement.

One embodiment of the invention will now be described with reference to the accompanying drawings FIG. 1 is a partial section and plan view of an advancing device in accordance with the invention, the table being omitted to show the individual parts of the device.

FIG. 3 is the same as FIG. 1 except that only that portion of the invention adjacent the receiving table and designed to reciprocate the table in one direction is illustrated.

FIG. 4 is a fragmentary sectional view taken along the plane 4—4 of FIG. 1.

DESCRIPTION OF PREFERRED EMBODIMENT

Figure 1:
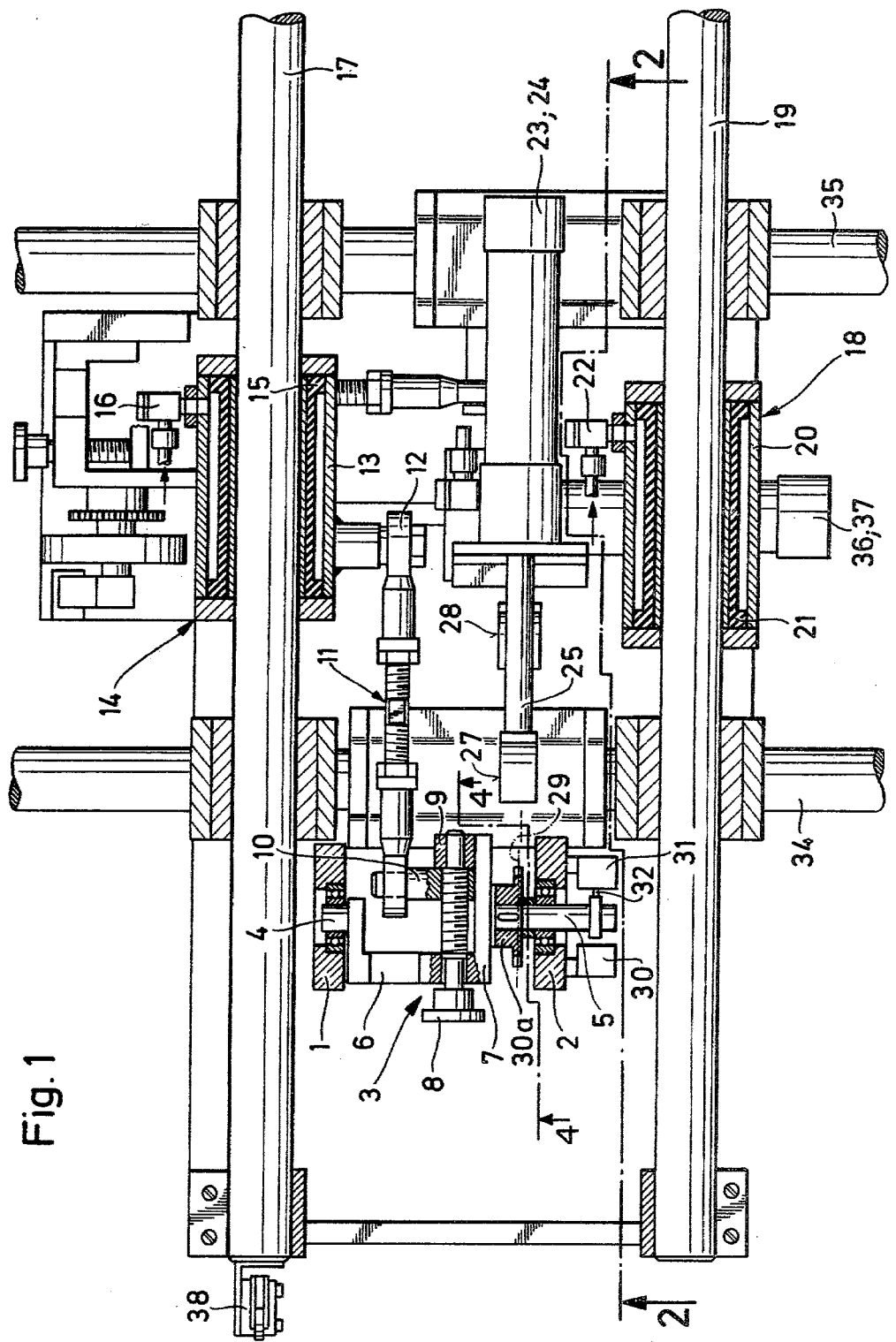

By means of the bearing blocks 1, 2 the crank shaft 3 is attached to the component receiving table (not shown). Between crank journals 4 and 5 borne in the bearing blocks 1 and 2 there extends an U-shaped crank member 6, which has a bearing 7 for an adjusting device 8, whose other end is carried in a second bearing 9. With the help of this adjusting device, which is constructed as a lead screw, eccentric pin 10 can be displaced as well to occupy different positions extending from one position aligned with the crank pins 4 and 5 and the furthest eccentric position and the pin 10 can be fixed in position.

The eccentric pin 10 is connected with a pitman 11, whose free end 12 is attached in a rotable manner on a sleeve 13 of the anchoring element denoted by general reference numeral 14. The sleeve 13 encompasses an elastically deformable cuff 15, which via the connection 16 can be so subjected to the action of compressed air that the sleeve 13 and accordingly the whole anchoring element 14 can be fixed on the guide rod 17.

A similarly constructed anchoring element 18 is arranged on the guide rod 19. It also comprises a sleeve 20 and a cuff 21 adapted to have actuating pressure medium supplied to it via the lead 22.

This anchoring element 18 is directly connected with the component receiving table, not shown.

Figure 2:
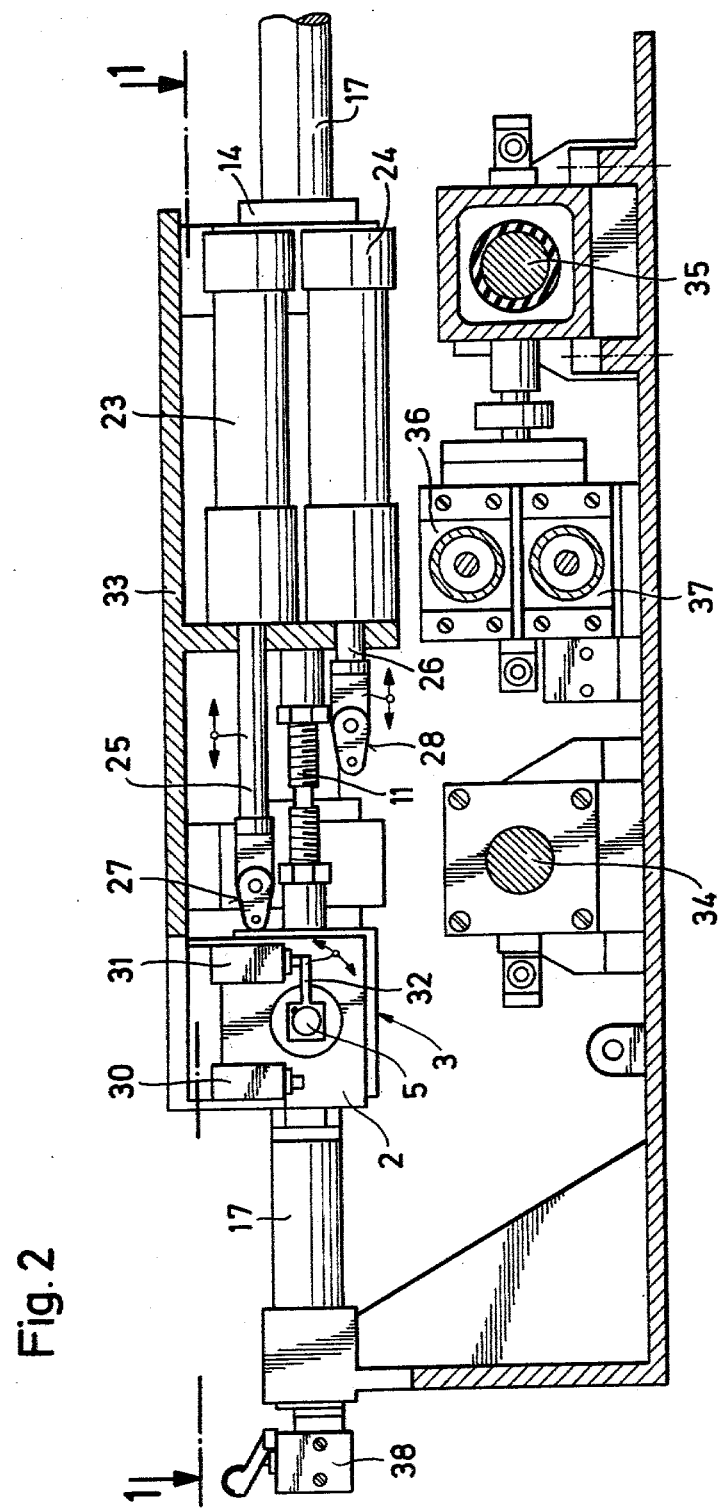
FIG. 2 shows a section along the line 2—2 of FIG. 1, with the table shown schematically.

The crank drive is driven by means of two piston-cylinder arrangements 23 and 24 as shown in FIG. 2 and which in the case of the embodiment of FIG. 2 are superposed and are arranged to move oppositely. Their piston rods 25 and 26 are connected with each other by means of a chain (not shown) with whose free ends 27 and 28 they are anchored. The chain is diagrammatically shown at 29 in FIG. 1 and runs over a sprocket wheel 30a. Adjacent to the crank drive 3 and in the vicinity of the crank pin 5 there are two limit switches 30 and 31 (see FIG. 2), which are actuated by means of an actuating finger 32 attached to the crank pin 5, at the end of each 180° stroke of the crank drive. These limit switches are arranged as part of a circuit, which on the one hand brings about the switching over or reversing of the two cylinders 23 and 24 and on the other hand ensures that the locating elements 14 and 18 are supplied with pressure medium, the control cycle being such that at the end of one 180° stroke, for example, the anchoring element 14 is clamped on the guide rod 17 and the achoring element 18 is freed to release it from the guide rod 19, so that on the return stroke of the piston-cylinder arrangement 23 and 25 the table shown diagrammatically at 33 in FIG. 2 is displaced by one step in the corresponding direction. At the end of this step the anchoring element 14 is freed and the anchoring element 18 performs a clamping action, so that the crank drive 3 can revert to its other position, the anchoring element 14 sliding on the guide rod 17, in which once again the anchoring element 18 is freed and the anchoring element 14 is clamped and the next step of the movement of the table can take place.

If the advancing movement of the table is to take place in the reverse direction it is sufficient to carry out a simple reversal of the corresponding control means.

In the lower part of FIG. 2 guide rods perpendicular to the guide rods 17 and 19 are indicated diagrammatically at 34 and 35. A similar cylinder arrangement parallel to the guide rods 34 and 35 is provided, which is indicated at 36 and 37 in a view directed towards the rear end. A further discussion of this arrangement is not called for because it functions in exactly the same manner as the arrangement described in conjunction with FIG. 1 for the forward movement of the table in the one coordinate.

38 denotes a limit switch, which brings about a further movement in the direction perpendicular to the plane of FIG. 2. This movement is carried out through one step as soon as one row has been completed in order to make possible the formation of the next parallel row in the rear direction, the cylinders, 23 and 24 being reversed, using the arrangement shown in FIG. 1.

What we claim is:

1. A device for high speed accurate positioning of a table through a plurality of intermittent incremental movements with graduated acceleration and deceleration, said device comprising: a crank and means secured to said table rotatably mounting said crank; a pair of alternately actuated fluid operated pistons and means connecting said pistons to said crank for reciprocating said crank through an arc of approximately 180°; a pair of fixed guide rods; a pair of elements slidably mounted, one on each of said rods; one of said elements being secured to the table; rod means having one end eccentrically connected to said crank and its other end connected to the other of said elements; a pair of sensors mounted to be alternately actuated by said crank at the opposite ends of its rotational movement; each of elements having a clamp for engaging said guide rods; means connected to said sensors for alternately operating said clamps in coordination with said pistons with the clamp of one of said elements being actuated while the crank is rotating in one direction and the clamp of the other of said elements being actuated while the crank is rotating in the opposite direction to effect incremental movement of said table; the chord of the arc of rotation of said crank being parallel to the surface of said table whereby the rate of lineal movement of the table has a sine wave pattern.

2. The device for high speed accurate positioning of a table as described in claim 1 wherein said connectng means is a wheel and a flexible member passing around said wheel, the ends of said flexible member being secured to said pistons.

3. The device for high speed accurate positioning of a table as described in claim 1 wherein said clamps are fluid operated and said sensor connected means are valves.

4. The device for high speed accurate positioning of a table as described in claim 2 wherein said wheel is a sprocket and said flexible member is a chain.

5. The device for high speed accurate positioning of a table as described in claim 1 wherein the connection between said one end of said rod and said crank is adjustable in a radial direction with respect to the center of rotation of said crank for varying the amount of linear movement resulting from rotation of said crank.

6. A device for high speed accurate positioning of a table through a plurality of intermittent incremental movements with graduated acceleration and deceleration, said device comprising a crank and a pair of blocks rotatably mounting said crank, said blocks being secured to the table; a wheel mounted on said crank for rotating the same; a flexible member extending around and engaging said wheel; a pair of hydraulically operated pistons, one connected to each end of said flexible member, said pistons being arranged such that when one is retracted the other is advanced whereby alternate operation of the pistons results in reciprocal rotation of said wheel and the crank; a pair of fixed guide rods; a pair of elements slidably mounted, one on each of said rods; one of said elements being secured to the table; means eccentrically connecting the other to said crank; a pair of sensors mounted to be alternately actuated by said crank at the opposite ends of a substantially 180° arc of rotation of said crank; each of elements having hydraulically operated clamps for engaging said guide rods; valve means connected to said sensors for alternately operating said clamps in sequential coordination with said pistons to effect incremental movement of said table; the chord of the arc of rotation of said crank being parallel to the surface of said table whereby the rate of lineal movement of the table has a sine wave pattern.

* * * * *